United States Patent
Chen et al.

(10) Patent No.: US 8,092,208 B2
(45) Date of Patent: Jan. 10, 2012

(54) GAS-ASSISTED MOLD SURFACE HEATING SYSTEM

(75) Inventors: Shia-Chung Chen, Taoyuan County (TW); Jen-An Chang, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 21 days.

(21) Appl. No.: 12/754,966

(22) Filed: Apr. 6, 2010

(65) Prior Publication Data
US 2010/0255143 A1 Oct. 7, 2010

(30) Foreign Application Priority Data
Apr. 7, 2009 (TW) .............................. 98111443 A

(51) Int. Cl.
*B29C 45/73* (2006.01)

(52) U.S. Cl. ........ 425/210; 425/227; 425/547; 425/548; 425/552

(58) Field of Classification Search .................. 425/547, 425/548, 552, 227, 546, 210
See application file for complete search history.

(56) References Cited

U.S. PATENT DOCUMENTS

| | | | | |
|---|---|---|---|---|
| 5,423,670 A | * | 6/1995 | Hamel | 425/144 |
| 5,928,677 A | * | 7/1999 | Gosdin | 425/130 |
| 6,322,350 B1 | * | 11/2001 | Voets et al. | 425/548 |
| 7,964,129 B1 | * | 6/2011 | James | 264/237 |

* cited by examiner

*Primary Examiner* — Timothy Heitbrink
(74) *Attorney, Agent, or Firm* — WPAT., P.C.; Justin King

(57) ABSTRACT

A gas-assisted mold surface heating system is disclosed, which comprise: an air supply, for providing air with a flow rate larger than 300 L/min; a heater, for heating air to a temperature higher than 400° C.; a mold, configured with a mold cavity, an inlet and an outlet; and an air storage tank; wherein, the inlet is connected to the heater through a pipeline for allowing the air from the air supply to flow into the cavity after being heated by the heater and thus to be for heating up the surface of the mold cavity while the heated air is being enabled to flow out of the cavity through the outlet and into the air storage tank. With the aforesaid system, surface temperature of the mold cavity can be raised to a point higher than a glass transmission point in a short period of time.

20 Claims, 6 Drawing Sheets ature that is lower than the glass transition point of the plastic material which is to be molded therein, so that the melted plastic is able to solidify to the configuration of the mold cavity as soon as it come into contact with the cavity surface.

GAS-ASSISTED MOLD SURFACE HEATING SYSTEM

FIELD OF THE INVENTION

The present invention relates to a mold heating system, and more particularly, to a gas-assisted mold surface heating system capable of heating a cavity surface of a mold by high temperature and high flow rate air.

BACKGROUND OF THE INVENTION

"With rapid advance of manufacturing technology, there are many methods being developed for molding plastics into required products, such as injection molding, blow molding, hot embossing molding, compression molding, draw molding, and so on. Among which, injection molding is the most common method of plastic part manufacturing which is used to create a large variety of products with different shapes and sizes, ranged from as simple as a cup to a very complex automotive dashboard, and also ranged from as small as a watch gear weighted only 0.01 gram to a very large bathing tub weighted more than 20 kilograms. Most importantly, they can create products with complex geometry that many other processes cannot, since it is advantageous in its ability of making complex plastic parts at high production rates and high tolerances of repeatability with high precision in dimension."

In a plastic injection molding process, a plastic material is fed into a heated barrel, melted, mixed, and forced into a mold cavity where it cools and hardens to the configuration of the mold cavity. Generally, the mold is only heated to a temperature that is lower than the glass transition point of the plastic material which is to be molded therein, so that the melted plastic is able to solidify to the configuration of the mold cavity as soon as it come into contact with the cavity surface.

In response to the smaller, thinner and lighter trend for the modern 3C products, a more advanced plastic injection molding process is in demand for satisfying the requirement of producing products configured with microstructures measured in hundreds of micrometers or even tens of micrometers, such as backlight panels, fiber optic connecters, etc., that can not be manufactured by conventional plastic injection molding as it is troubled by the molding conditions of flowability and plastic solidification while being used for manufacturing the aforesaid products configured with microstructures.

It is noted during the development of the present invention that the key for manufacturing the aforesaid products configured with microstructures by plastic injection molding relies on how to enable the mold surface temperature to change rapidly and dynamically. Moreover, it is important to keep the mold at a temperature higher than plastic's glass transition point during the procedure of filling the melted plastic into the mold, and then enable the mold temperature to drop rapidly for the purpose of reducing the total cycle time for plastic molding, by that the microstructures of high aspect ratio can be formed perfectly on the molded products with high precision.

Thus, the focal point of the present invention is how to heat up a mold in relatively short period of time and cool down the same thereafter as well.

SUMMARY OF THE INVENTION

In view of the disadvantages of prior art, the primary object of the present invention is to provide a gas-assisted mold surface heating system capable of guiding a heated air to flow directly to and through a cavity surface of a mold in high flow rate for heating the cavity surface to a temperature higher than a glass transition point in a short period of time.

To achieve the above object, the present invention provides a gas-assisted mold surface heating system, comprising: an air supply, for providing air with a flow rate larger than 300 L/min; a heater, for heating air from the air supply to a temperature higher than 400° C.; a mold, configured with a mold cavity, an inlet and an outlet; and an air storage tank, for storing air exhausted from the outlet; wherein, the inlet is connected to the heater through a pipeline for allowing the air from the air supply to flow into the mold cavity after being heated by the heater and thus to be for heating up the surface of the mold cavity while the heated air is being enabled to flow out of the cavity through the outlet and into the air storage tank. With the aforesaid system, surface temperature of the mold cavity can be raised to a point higher than a glass transmission point in a short period of time.

With the aforesaid system, surface temperature of the mold cavity can be raised to a point higher than a glass transmission point in a short period of time by the use of hot air with temperature higher than 400° C. and flowing with a flow rate larger than 300 L/min, so that the microstructures of high aspect ratio can be formed perfectly on the molded products with high precision.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
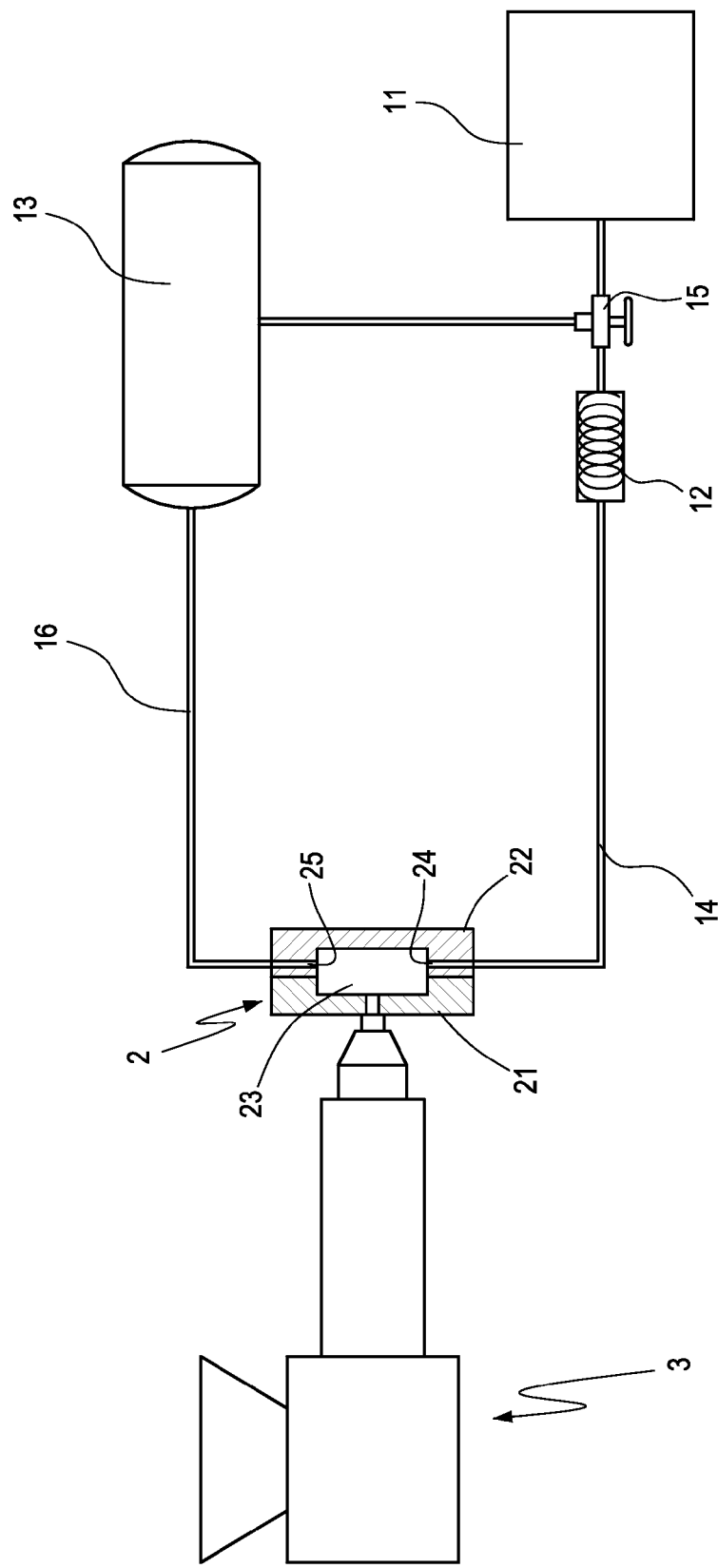
FIG. 1 is a schematic diagram showing a gas-assisted mold surface heating system of the invention.

Please refer to FIG. 1, which is a schematic diagram showing a gas-assisted mold surface heating system of the invention. The gas-assisted mold surface heating system shown in FIG. 1 is adapted for heating a mold 2 in a plastic injection molding process, which comprises: an air supply 11, a heater 12, an air storage tank 13 and a pipeline 14.

"The air supply 11 is capable of providing air with a flow rate larger than 300 L/min. Substantially, the air supply 11 is an air compressor that is preferably designed to provide air with a flow rate ranged between 300 L/min and 500 L/min. As shown in FIG. 1, the air supply 11 is sequentially connected to the heater 12, the mold 2, and the air storage tank 13 by the pipeline 14. Moreover, for controlling the amount of the air flowing in the whole gas-assisted mold surface heating system, the system further configured a flow control valve 15 on the pipeline 14 at a position between the air supply 11 and the heater 12."

"The heater 12 is used for heating air from the air supply 11 to a temperature higher than 400° C. Substantially, the heater 12 is an electric heater with a preferred capacity capable of heating the air to a temperature between 400° C. and 600° C. In order to use the heated air efficiently, the heater 12 is disposed neighboring to the mold 2."

The air storage tank 13 is connected to the pipeline after the mold 2 since it is used for storing the hot air after it is used for heating the mold 2. For improving energy efficiency, there is a recycle pipeline 16 being disposed in the heating system of the present embodiment in a manner that it is connected to the storage tank 13 by one end thereof while the other end of the recycle pipeline 16 is connected to the pipeline 14 at a position between the heater 12 and the air supply 11. Moreover, in order to control the amount of air being recycled efficiently, there is a flow control valve 15 arranged in the mold heating system that is connected to the recycle pipeline 16 to be used for controlling the air flow of the recycled air.

The mold 2, being adapted for a plastic injection machine 3, is composed of at least two dies 21, 22 capable of being integrated into a unity when clamping while forming a mold cavity 23 therein. The mold 2 is configured with at least an inlet 24 and at least an outlet 25 that are connected to the mold cavity 23 and are disposed respectively at two ends of the mold cavity 23 relating to its long axis. In this embodiment the inlet 24 and the outlet 25 are disposed on the same die of the mold 2. As shown in FIG. 1, the inlet 24 is connected to the heater 12 through the pipeline 14 whereas the outlet 25, being formed on the mold 2 at a position corresponding to the inlet 24, is connected to the air storage tank 13 through the pipeline 14, by that the hot air from the heater 12 can be fed into the mold cavity 23 through the inlet 24 and then can be exhausted out of the mold cavity 23 through the outlet 25 after heating the surface of the mold cavity 23.

Since the air supply 11 of the invention is designed to provide air with a flow rate larger than 300 L/min that is to be heated by the heater 12 to a temperature higher than 400° C., there will be a large amount of high-temperature air flowing through the surface of the mold cavity 23 for heating the same to a designated temperature in a comparatively short period of time. In fact, the surface of the mold cavity can be heated to 120° C. in about 8 seconds, by which the microstructures of high aspect ratio can be formed perfectly on the consequent molded products with high precision.

Besides the aforesaid plastic injection machine, the mold 2 can be adapted for injection compression molding process. Generally, the injection compression molding process comprises the steps of: feeding, pressure-keeping, compressing, cooling, and so on. However, the gas-assisted mold surface heating system of the invention not only is used for heating the mold before the feeding step, but also is used for keeping the temperatures of the mold and the injected plastic during the pressure-keeping and the compressing steps, so that the microstructures of high aspect ratio can be formed perfectly on the consequent molded products with high precision.

Figure 2:
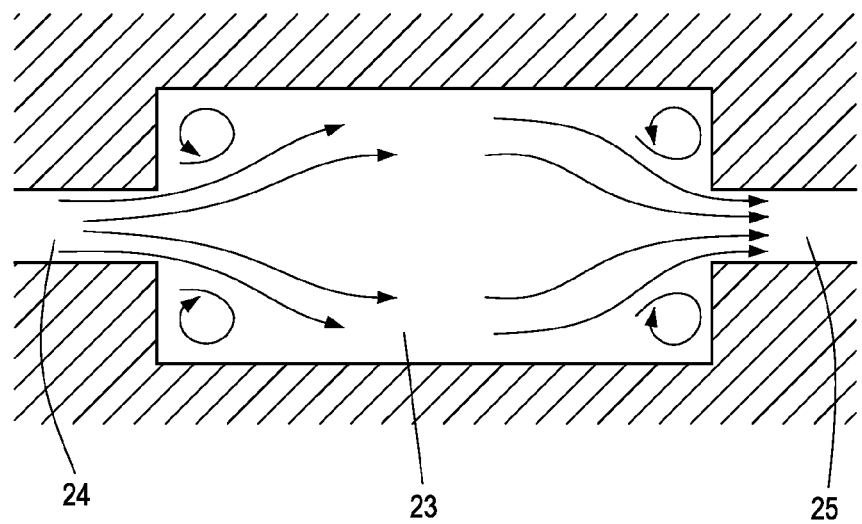
FIG. 2 is a schematic view depicting how air is flowing and trapped in a mold cavity when there is a big difference between its sectional area and those of its inlet and outlet.

Please refer to FIG. 2, which is a schematic view depicting how air is flowing and trapped in a mold cavity when there is a big difference between its sectional area and those of its inlet and outlet. As shown in FIG. 2, it is noted that when there is a big difference between the sectional area of the mold cavity 23 and those of its inlet 24 and outlet 24, it is more than likely to have vortexes being formed at the corners next to the inlet 24 which causes a portion of the hot air flowing into the mold cavity 23 through the inlet 24 to be trapped at the corners and thus adversely affects the heating efficiency, and moreover, it is going to cause the flowing speed of the hot air to accelerate at the position between the joint of the outlet 25 and the mold cavity 23 so as to cause overheating thereat and consequently cause the surface of the mold cavity 23 to be heated unevenly.

Figure 3:
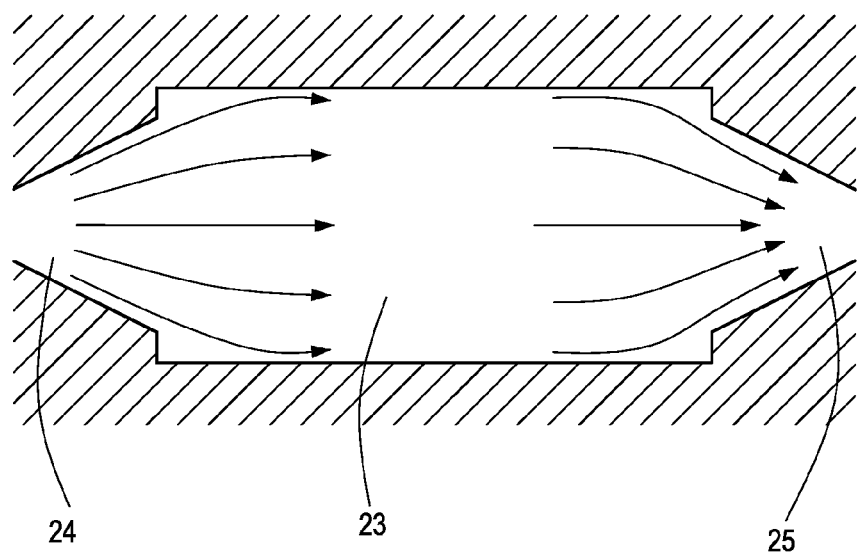
FIG. 3 is a schematic view depicting how air is flowing in and out of a mold cavity through its tapered inlet and outlet.

Therefore, when there is a big difference between the sectional area of the mold cavity 23 and those of its inlet 24a and outlet 25a, the inlet 24a and the outlet 25a should be tapered in a manner that the sectional area relating to ends of the inlet 24 and the outlet 25a are connected to the mold cavity 23 is larger than those of their another ends in respective, as shown in FIG. 3. With the aforesaid tapering design, the speed of the hot air flowing through the mold cavity 23 is evenly distributed so that the surface of the mold cavity 23 can be heated evenly.

Figure 4:
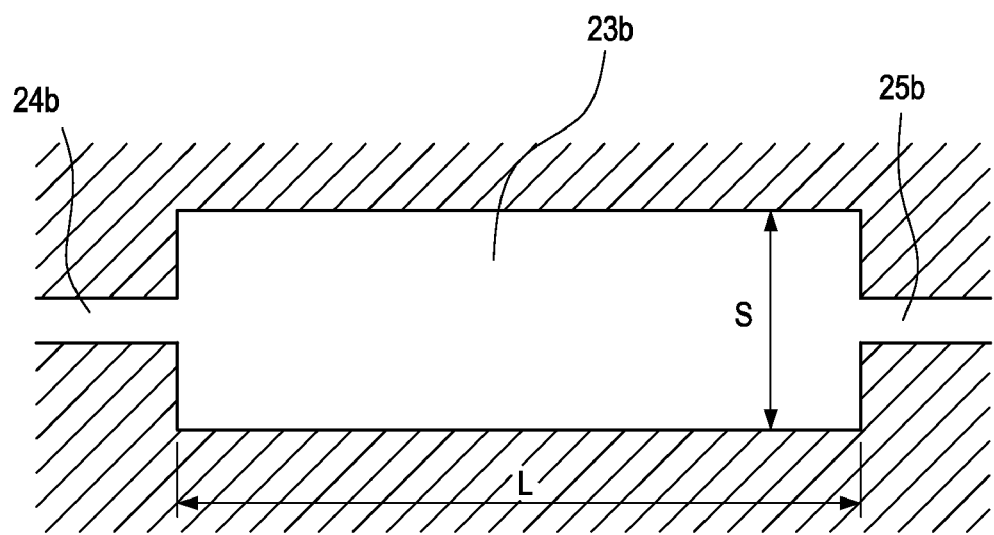
FIG. 4 is a schematic view showing the disposition of a mold cavity and its relating inlet and outlet according to a first embodiment of the invention.

In addition, it is noted that the shape of the mold cavity as well as the positions of the inlet and outlet can all affect the heating of the mold cavity. In the embodiment of the present invention, the shape of the mold cavity 23b is optimized by enabling the ratio between the lengths of its long axis L and short axis S to be larger than three when the inlet 24b and the outlet 25b are disposed respectively at two ends of the mold cavity 23b relating to its long axis, as shown in FIG. 4. With the aforesaid configuration, air can flow more smoothly in the mold cavity 23b for achieving a better heating efficiency.

Figure 5:
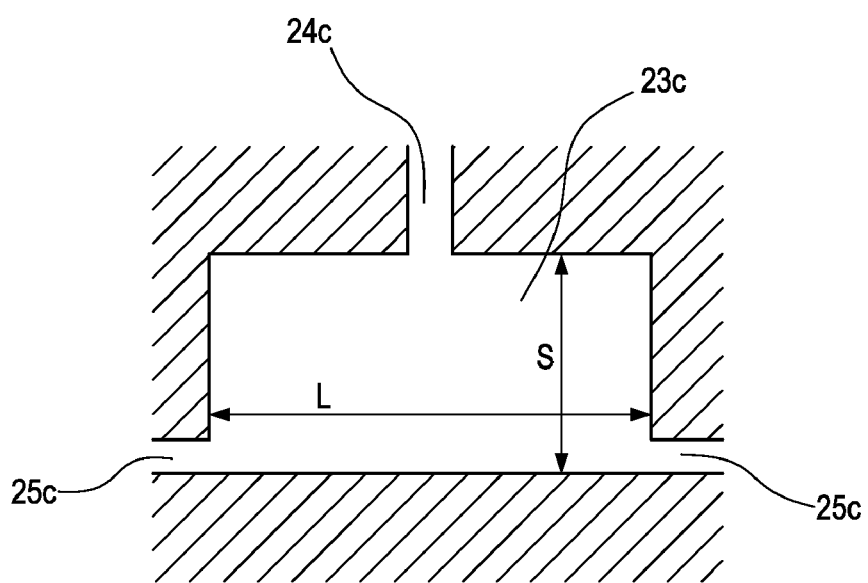
FIG. 5 is a schematic view showing the disposition of a mold cavity and its relating inlet and outlet according to second embodiment of the invention.

On the other hand, when the inlet 24c is disposed at an end of the mold cavity 23c relating to its short axis S while the outlet 25c is disposed at another end of the mold cavity 23c relating to its short axis S away from the position corresponding to the extending of the inlet 23b, the shape of the mold cavity 23c is optimized by enabling the ratio between the lengths of its long axis L and short axis S to be smaller than three, as shown in FIG. 5. With the aforesaid configuration, hot air flowing into the mold cavity 23c can be utilized efficiently for heating the surface of the mold cavity 23c. In addition, since the outlet 25c is disposed at another end of the mold cavity 23c relating to its short axis S away from the position corresponding to the extending of the inlet 23b while extending along the long axis L, air can be enabled to flow more smoothly in the mold cavity 23b for achieving a better heating efficiency.

Figure 6A:
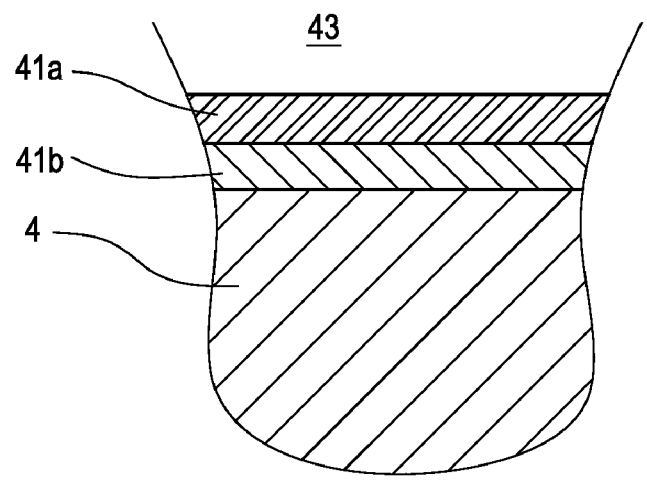
FIG. 6A and FIG. 6B show two different molds being adapted for the gas-assisted mold surface heating system of the invention.
Figure 6B:
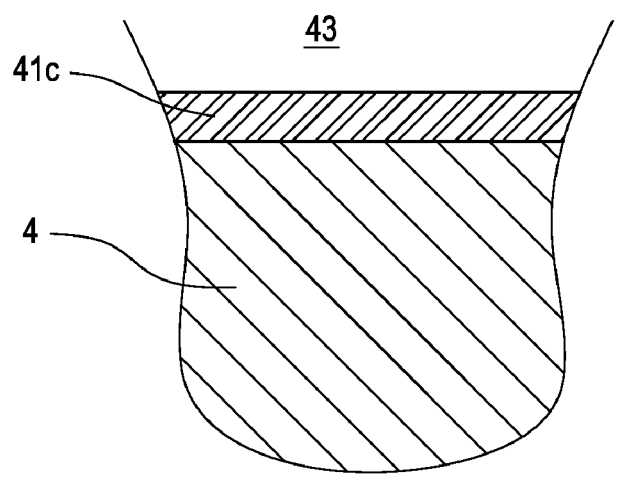

As known to those skilled in the art that the smaller the mass of the portion required to be heated, the better the heating efficiency will be. Therefore, the present invention provides two different molds being adapted for the gas-assisted mold surface heating system of the invention, as shown in FIG. 6A and FIG. 6B. In FIG. 6A, the mold 4 further has an insert 41a disposed right next to the mold cavity 43 in manner that the insert 41a and the mold 4 is separated by an heat insulation layer 41b sandwiched therebetween. The insert 41a is made of a material of high heat transfer coefficient, such as electroforming nickel-based alloys, and is formed with a thickness about 0.5 mm. The heat insulation layer 41b a material of low heat transfer coefficient, such as ceramics, and cobalt oxide, and is formed with a thickness about 0.5 mm.

In this embodiment, since the insert 41a is made of a material of high heat transfer coefficient of only about 0.5 mm in thickness and also since the inert 41a and the mold 4 are separated only by the heat insulation layer 41b, the hot air flowing into the mold cavity 43 is used for heating only the insert 41a whose mass is comparatively much smaller than the whole mold cavity so that the mold heating system of the invention is able to heat the surface of the mold cavity to 140° C.~165° C. in about 4~8 seconds. Thus, the heating efficiency of the present embodiment is substantially better than the embodiment shown in FIG. 1.

In FIG. 6B, the mold 4 also has an insert 41c disposed right next to the mold cavity 43 in manner that the side of the insert 41c opposite to that facing toward the mold cavity 43 is in direct contact with the mold 4. Similarly, the hot air flowing into the mold cavity 43 is used for heating only the insert 41c so that the heating efficiency of the present embodiment is substantially better than the embodiment shown in FIG. 1.

Figure 7A:
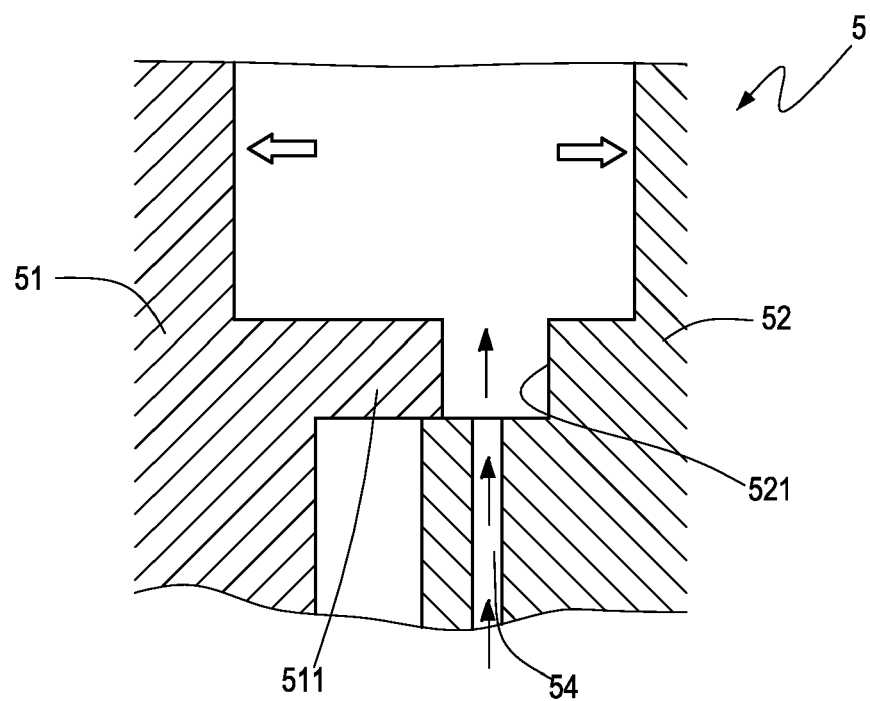
FIG. 7A shows a mold for a gas-assisted mold surface heating system before clamping according to an embodiment of the invention.
Figure 7B:
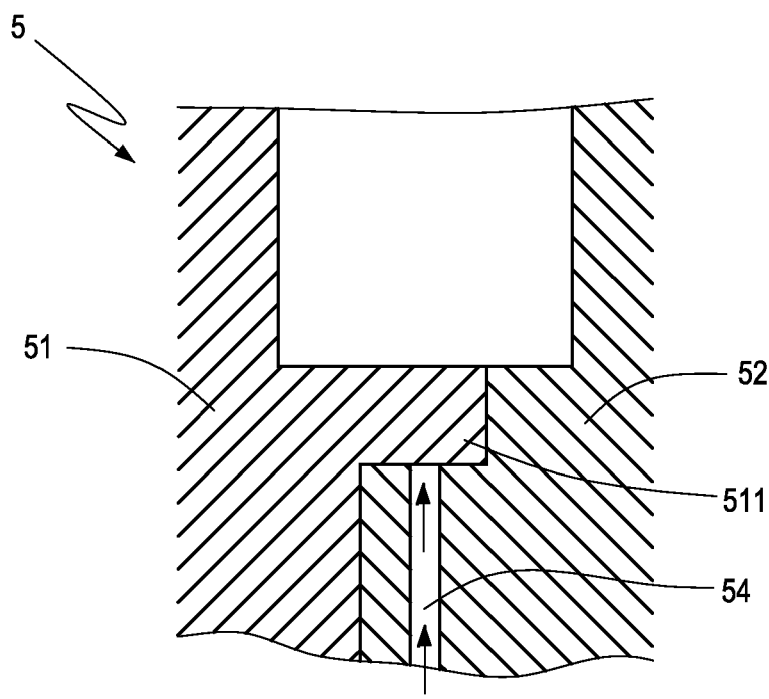
FIG. 7B shows a mold for a gas-assisted mold surface heating system of FIG. 7A after clamping.

In order to close the inlet and the outlet automatically when clamping, the present invention provides a mold adapted for the gas-assisted mold surface heating system of the invention, as shown in FIG. 7A and FIG. 7B. As shown in FIG. 7A and FIG. 7B, the mold 5 is composed of two dies 51, 52 capable of being integrated into a unity when clamping; and the inlet 54 is formed at a specific location on the die 52 while forming a block 511 on another die 51 at a position thereof corresponding to the inlet 54. Moreover, the die 52 is formed with a recess 521 at a position corresponding to the block 511 and the recess is designed to communicate with the inlet 54. Thus, the aforesaid configuration can ensure air to flow without obstruction through the inlet 54 when not in clamping, as shown in FIG. 7A, and enabling the flow in the inlet 54 to be blocked by the block 511 when clamping.

Figure 8A:
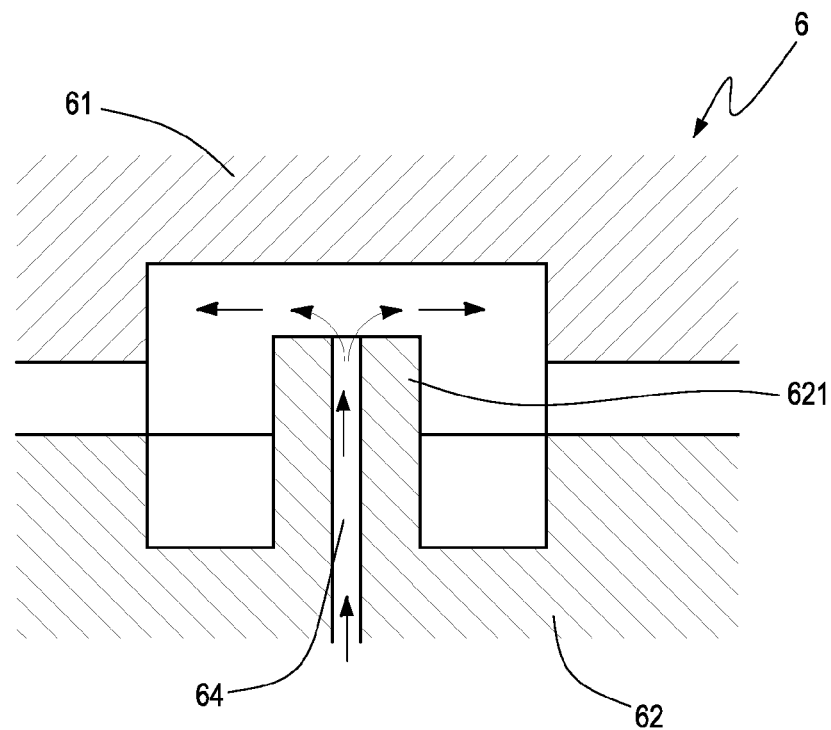
FIG. 8A shows a mold for a gas-assisted mold surface heating system before clamping according to another embodiment of the invention.
Figure 8B:
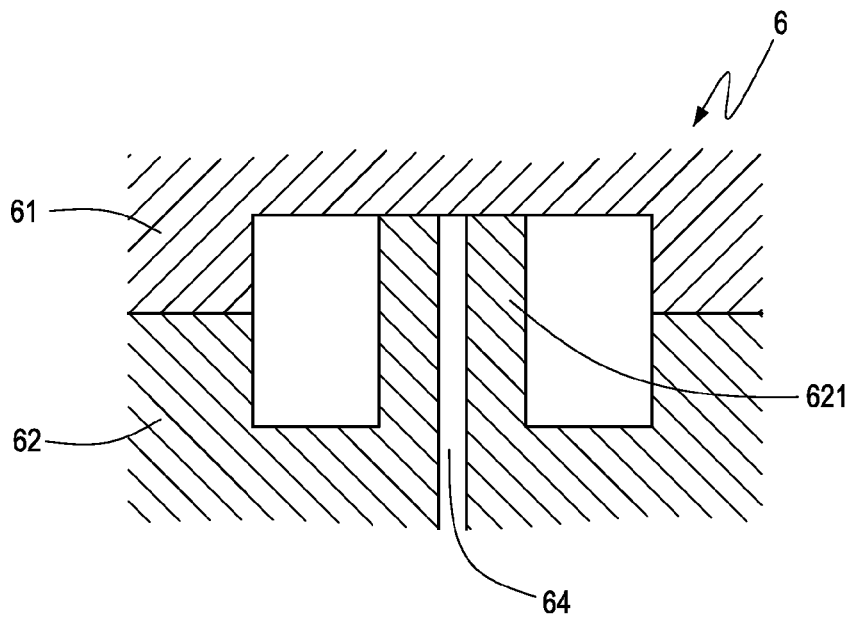
FIG. 8B shows a mold for a gas-assisted mold surface heating system of FIG. 8A after clamping.

In addition, the present invention further provides another mold adapted for the gas-assisted mold surface heating system of the invention, as shown in FIG. 8A and FIG. 8B. As shown in FIG. 8A and FIG. 8B, the mold 6 is composed of two dies 61, 62 capable of being integrated into a unity when clamping; and the die 62 is formed with an extrusion portion 621 at a specific location thereof that will abut against the die 61 by the top thereof while clamping; and since the inlet 64 is formed inside the die 62 and is opened to the top of the extrusion portion 621, air flowing through the inlet 64 is able to flow into the cavity when not clamping as the top of the extrusion portion 621 is not abutted against the die 61, as shown in FIG. 8A; and air flowing through the inlet 64 is blocked from flowing into the cavity when clamping as the top of the extrusion portion 621 is abutted against the die 61. It is noted that although the two aforesaid molds are configured differently, both can close the inlet automatically when clamping.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A gas-assisted mold surface heating system, comprising:
   an air supply, for providing air with a flow rate larger than 300 L/min;
   a heater, for heating air from the air supply to a temperature higher than 400° C.;
   a mold, configured with a mold cavity, an inlet, and an outlet, wherein the inlet and the outlet are connecting to the mold cavity; and
   an air storage tank, for storing air exhausted from the outlet;
   wherein, the inlet is connected to the heater through a pipeline for allowing the air from the air supply to flow into the mold cavity after being heated by the heater, and thus for heating up the surface of the mold cavity while the heated air is being enabled to flow out of the cavity through the outlet and into the air storage tank.

2. The system of claim 1, wherein the air storage tank is connected to a recycle pipeline at an end thereof while the other end of the recycle pipeline is connected to the pipeline at a position between the heater and the air supply.

3. The system of claim 1, further comprising:
   a flow control valve, disposed at a position between the air supply and the heater to be used for controlling the flow rate of the air flowing into the heater.

4. The system of claim 1, wherein the inlet and the outlet are disposed respectively at two ends of the mold cavity.

5. The system of claim 4, wherein the shape of the mold cavity is is that a ratio between the lengths of its long axis and short axis to be larger than three.

6. The system of claim 1, wherein the inlet is disposed at an end of the mold cavity relating to its short axis while the outlet is disposed of the mold cavity relating to its short axis away from positions corresponding to the extending of the inlet.

7. The system of claim 6, wherein the shape of the mold cavity is that a ratio between the lengths of its long axis and short axis to be smaller than three.

8. The system of claim 1, wherein when the interior of the mold cavity is configured with microstructures.

9. The system of claim 1, wherein the inlet is tapered in a manner that the sectional area relating to an end connecting to the mold cavity is larger than the inlet's another end connecting to the pipeline.

10. The system of claim 1, wherein the mold is composed of at least two dies capable of being integrated into a unity when clamped; and the inlet is formed on one of the at least two dies while enabling another die to be configured with a block to be used for blocking the inlet in clamping while keeping air flowing without obstruction when not clamped.

11. The system of claim 1, wherein the mold is composed of at least two dies capable of being integrated into a unity when clamped; and the inlet is formed at a specific location on one of the at least two dies in a manner that the inlet is enabled to communicate with the mold cavity when the at least two dies are detached from each other and not integrated into a unity while enabling the inlet to be blocked by another die other than the one formed with the inlet when the at least two dies are integrated into a unity.

12. The system of claim 1, wherein the mold further comprises an insert.

13. The system of claim 12, wherein there is a heat insulation layer sandwiched between the insert and the mold.

14. The system of claim 12, wherein the insert is made of an electroformed nickel-based alloy.

15. The system of claim 12, wherein the thickness of the insert is about 0.5 mM.

16. The system of claim 13, wherein the heat insulation layer is made of a ceramic material.

17. The system of claim 13, wherein the thickness of the heat insulation layer is about 0.5 mm.

18. The system of claim 1, wherein the air supply is an air compressor.

19. The system of claim 1, wherein the flow rate of air provided by the air supply is ranged between 300 L/min and 500 L/min.

20. The system of claim 1, wherein the preferred capacity of the heater is to heat the air to a temperature between 400° C. and 600° C.

* * * * *